United States Patent [19]
Stoltze

[11] 3,741,634
[45] June 26, 1973

[54] BINOCULAR SPECTACLES
[76] Inventor: Morton Stoltze, 1 Fox Lane, West Nyack, N.Y.
[22] Filed: Dec. 14, 1971
[21] Appl. No.: 207,883

[52] U.S. Cl............... 351/57, 350/145, 350/146, 351/19, 351/20, 351/22
[51] Int. Cl.... G02c 7/08, G02b 25/02, G02b 27/02
[58] Field of Search ............... 351/57, 58, 47, 48, 351/19–22; 350/145, 146

[56] References Cited
UNITED STATES PATENTS

| | | | |
|---|---|---|---|
| 2,155,575 | 4/1939 | Wittig | 350/146 |
| 2,256,026 | 9/1941 | Husar | 350/146 |
| 997,289 | 7/1911 | Hamilton | 351/57 |
| 2,369,761 | 2/1945 | Stegeman | 351/57 |
| 3,600,069 | 8/1971 | McNeill | 351/47 |
| 2,431,798 | 12/1947 | Frommer | 351/57 |
| 2,422,661 | 6/1947 | Ellis | 351/57 |

Primary Examiner—David Schonberg
Assistant Examiner—Paul A. Sacher
Attorney—Allison C. Collard

[57] ABSTRACT

Binocular spectacles comprising at least one binocular lens, a flexible cylindrical wire bent so as to have an upper U-shaped lip disposed over the top of conventional eyeglass frames and end members having U-shaped lips for engaging the sides of the eyeglass frames, for mounting the lenses on the frames, and a pair of U-shaped mounting members pivotably coupled together by a rigid thin mounting strip, and attached to the binocular lens and cylindrical wire, for pivotably coupling the binocular lens to the mounting wire and pivotably securing the binocular lenses on the eyeglass frames.

3 Claims, 3 Drawing Figures

PATENTED JUN 26 1973 3,741,634

BINOCULAR SPECTACLES

The present invention relates to binocular spectacles, and in particular, to binocular spectacles which are detachably mountable on conventional eyeglass frames adjacent the eyes of the user and lenses of the conventional frames.

In order to facilitate the reading of fine print, and the examination of small objects under magnification, it is preferable to provide binocular lenses which are both adjustable in front of the eyes of the user, and detachably mountable on the head of the user.

Accordingly, the present invention provides a pair of binocular spectacles comprising at least one binocular lens pivotably coupled to, and detachably mounted on, conventional eyeglass frames. An elongated cylindrical wire is folded and bent to provide a U-shaped lip at its center which is disposed over the top rim of the frames, and a pair of downward and outwardly extending flexible end members having U-shaped ends for engaging the eyeglass frames, for detachably mounting the lenses on the frames. A pair of U-shaped coupling members are affixed to the detachable wire and the lenses and pivotably coupled to the ends of a rigid mounting strip. The binocular lens is thus pivotable both with respect to the eyeglass frames and the rigid mounting strip.

It is therefore an object of the present invention to provide binocular spectacles which are detachably mountable on conventional eyeglass frames.

It is also an object of the present invention to provide binocular spectacles which are adjustable in front of the eyes of the user, so that they may be pivotably moved out of his line of vision when not in use, and be readily available for immediate reuse.

It is also an object of the present invention to provide binocular spectacles which are simple in design, easy to manufacture, and reliable in operation.

Others objects and features of the present invention will become apparent from the following detailed description taken in connection with the accompanying drawings which disclose a single embodiment of the invention. It is to be understood, however, that the drawings are designed for the purposes of illustration only, and are not intended as a definition of the limits and scope of the invention.

In the drawings, wherein similar reference numerals denote similar elements throughout the several views.

Figure 1:
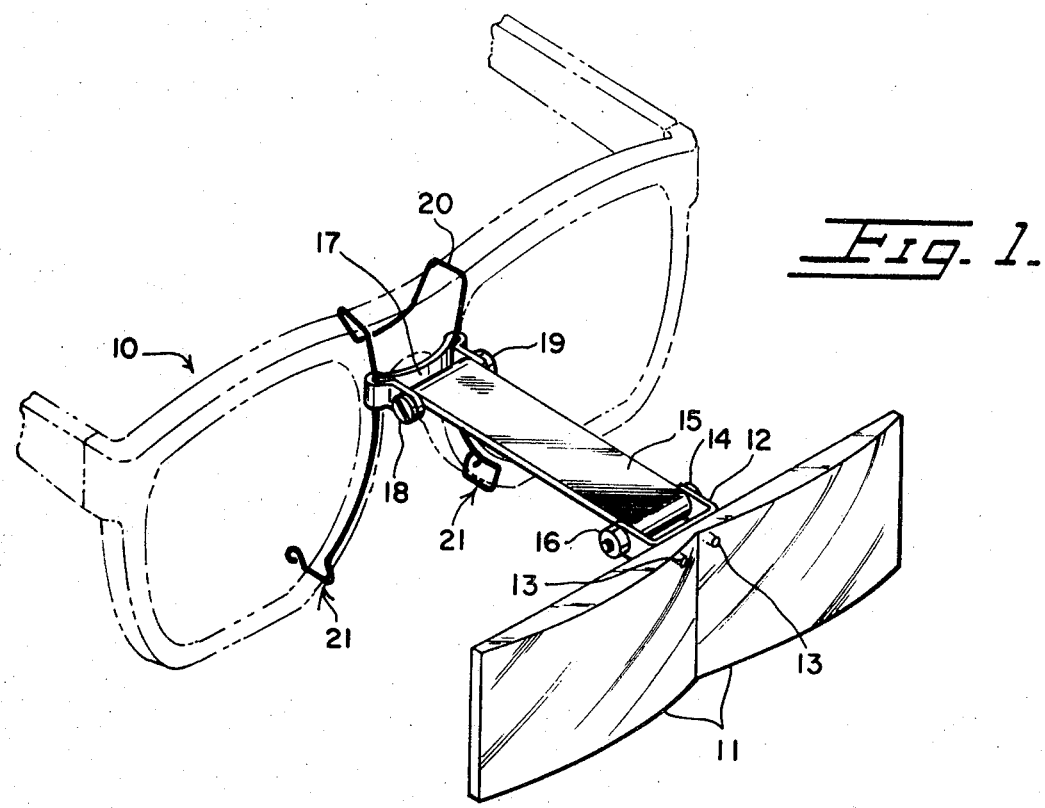
FIG. 1 is a front perspective view of binocular spectacles constructed in accordance with the present invention, shown detachably mounted on a pair of conventional eyeglass frames.
Figure 2:
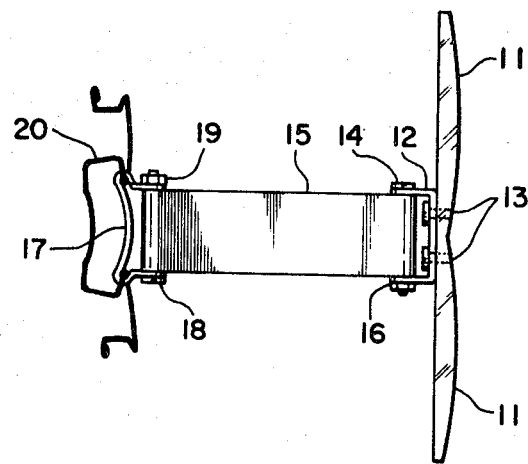
FIG. 2 is a top plan view of the bincoular spectacles illustrated in FIG. 1, shown removed from the frames.
Figure 3:
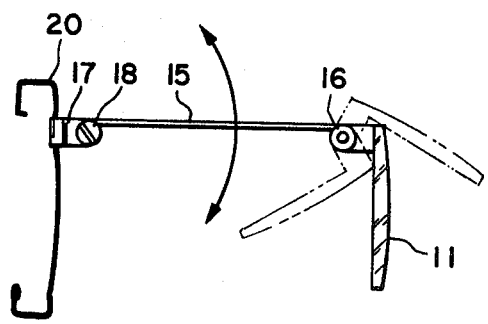
FIG. 3 is a side view of the spectacles of FIG. 2, showing the pivotable movement of the lenses with respect to the eyeglass frames.

Referring to the drawings, there is shown a pair of conventional eyeglass frames 10 to which a pair of binocular lenses 11 are pivotably mounted. Both of the lenses are integrally formed from a single block of lens material, such as plastic, glass, etc., and have a flat rear surface and a front curved surface including two circular arcs. A U-shaped mounting member 12 is affixed to lenses 11 by rivets or screws 13 secured in lenses 11. Member 12 has circular apertures in its end through which a bolt 14 is disposed for pivotably securing a thin planar mounting strip 15. A nut 16 secures the strip on the U-shaped member 12. A second U-shaped member 17 is pivotably secured in a similar manner to the other end of strip 15 by another bolt 18 and nut 19. The ends of mounting strip 15 are bent under so as to provide cylindrical apertures at the ends thereof for receiving bolts 14 and 18, and allowing pivotable moement of strip 15 with respect to U-shaped members 17 and 12.

Member 17 has the corner portions thereoto bent to provide slots or recesses for receiving an elongated mounting wire 20. The wire is bent at approximately the center of its length to provide a U-shaped lip which is disposed over the top surface of eyeglass frames 10. The ends of wire 20 extend downwardly and outwardly along the contour of the portion of the frames supporting the eyeglass lenses, and have U-shaped end members 21 provided thereon which engage the outer portion of the eyeglass frames adjacent the lenses to secure the binocular lenses. Wire 20 is flexible, and, thus, the downwardly extending members are forced outwardly so that they securely engage the eyeglass frames.

Any conventional material may be used to construct the spectacles, U-shaped members, mounting wire, and thin rigid mounting strip. For example, plastic or glass may be used to construct the lenses, and metal or plastic material may be used to construct the U-shaped mounting members, flexible wire member, and the thin rigid strip. It should be noted that although two lenses integrally formed with each other are shown, a single lens, disposed on either side of the eyeglass frames, or a separate pair of lenses disposed on both sides thereof, may also be used. Furthermore, since the binocular lenses are detachably mounted on strip 15, lenses of different magnification may be easily interchanged by loosening bolt 14 and nut 16, removing the lenses, and mounting new lenses on strip 15 with the nut and bolt.

While only a single embodiment of the present invention has been shown and described, it will be obvious to those persons skilled in the art that many changes and modifications can be made thereunto without departing from the spirit and scope of the invention.

What is claimed is:

1. Binocular spectacles, for detachable mounting on eyeglass frames, comprising:
    at least one magnifying lens;
    an elongated, flexible strip of wire, bent at its center so as to form a downwardly-extending, U-shaped lip for disposal over the top of the eyeglass frames and a pair of downwardly extending end members for disposal along the contour of the eyeglass frames adjacent the lenses thereof, and further bent at its ends so as to form upwardly extending U-shaped lips at the ends of said end members for engaging and receiving the eyeglass frames adjacent the lenses thereof, said strip of wire being coupled to said lens for mounting said lens on the eyeglass frames; and
    an elongated, planar strip of rigid material, pivotably coupled at one end to said lens and at the other end to said end members for pivotably mounting said lens on said strip of wire so that said lens is pivotable independently with respect to said planar strip of material, and said lens and said strip of material are pivotable with respect to said strip of wire.

2. The binocular spectacles as recited in claim 1, wherein said planar strip of material includes a pair of cylindrical apertures disposed at each end thereof integrally formed therewith, a first U-shaped flange, affixed to said lens and pivotably coupled to said strip by a cylindrical bolt disposed through said flange and one of said apertures disposed in said strip of material, and a second rigid U-shaped flange, disposed over said end members, and pivotably coupled to said planar strip of material by a cylindrical bolt disposed through said second flange and said aperture in the other end of said strip of material.

3. The binocular spectacles as recited in claim 2, wherein said lens comprises a pair of magnifying lenses, integrally formed with each other so as to form a unitary lens member, each of the magnifying lenses being disposed in front of a corresponding one of the lenses of the eyeglass frames.

* * * * *